United States Patent
Yoshida

(10) Patent No.: US 7,961,800 B2
(45) Date of Patent: Jun. 14, 2011

(54) ADAPTIVE RADIO/MODULATION APPARATUS, RECEIVER APPARATUS, WIRELESS COMMUNICATION SYSTEM, AND WIRELESS COMMUNICATION METHOD

(75) Inventor: Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 644 days.

(21) Appl. No.: 12/066,128

(22) PCT Filed: Jun. 30, 2006

(86) PCT No.: PCT/JP2006/313142
§ 371 (c)(1),
(2), (4) Date: Mar. 7, 2008

(87) PCT Pub. No.: WO2007/029406
PCT Pub. Date: Mar. 15, 2007

(65) Prior Publication Data
US 2009/0232194 A1    Sep. 17, 2009

(30) Foreign Application Priority Data
Sep. 7, 2005    (JP) .................................. 2005-259363

(51) Int. Cl.
*H04K 1/10* (2006.01)
*H04L 27/28* (2006.01)
(52) U.S. Cl. .......................... 375/260; 375/295; 375/316
(58) Field of Classification Search .......... 375/259–260, 375/285, 295–297, 316, 340, 346; 370/203, 370/210, 252
See application file for complete search history.

(56) References Cited

U.S. PATENT DOCUMENTS

| | | | |
|---|---|---|---|
| 6,754,195 B2 * | 6/2004 | Webster et al. | 370/335 |
| 6,937,558 B2 | 8/2005 | Wakutsu | |
| 7,016,425 B1 * | 3/2006 | Kraiem | 375/261 |
| 7,099,299 B2 * | 8/2006 | Liang et al. | 370/342 |
| 7,161,987 B2 * | 1/2007 | Webster et al. | 375/260 |
| 7,170,880 B2 * | 1/2007 | Webster et al. | 370/338 |
| 7,272,416 B2 * | 9/2007 | Sano | 455/562.1 |
| 7,492,830 B2 * | 2/2009 | Bocquet | 375/267 |
| 2001/0021182 A1 | 9/2001 | Wakutsu | |
| 2004/0081075 A1 | 4/2004 | Tsukakoshi | |
| 2008/0310545 A1 * | 12/2008 | Webster et al. | 375/295 |

(Continued)

FOREIGN PATENT DOCUMENTS
EP    1 130 840    9/2001
(Continued)

OTHER PUBLICATIONS
Chinese Patent Office issued Chinese Office Action dated Apr. 13, 2010, Application No. 200680032960.X.

(Continued)

*Primary Examiner* — Jean B Corrielus
(74) *Attorney, Agent, or Firm* — Young & Thompson

(57) ABSTRACT

Adaptive modulation part (1) modulates a signal in a modulation scheme selected based on a modulation mode, switch (2) selects a radio scheme congenial to the modulation scheme in which the signal is modulated. When the selected radio scheme is single-carrier scheme, single-carrier generation part (3) generates a single-carrier signal. When the selected radio scheme is a multicarrier scheme, multicarrier generation part (4) generates a multicarrier signal, the generated single-carrier signal or multicarrier signal is converted into a carrier band signal by quadrature modulation part (5), and the converted signal is amplified by transmission amplifier (6).

9 Claims, 12 Drawing Sheets

U.S. PATENT DOCUMENTS

2010/0110991 A1 * 5/2010 Kwak .................... 370/328

FOREIGN PATENT DOCUMENTS

| JP | 09-083600 A | 3/1997 |
|----|-------------|--------|
| JP | 10-232276 A | 9/1998 |
| JP | 2000-261403 A | 9/2000 |
| JP | 2001-313685 A | 11/2001 |
| JP | 2001-320346 A | 11/2001 |
| JP | 2001-333051 A | 11/2001 |
| JP | 2003-051802 A | 2/2003 |
| JP | 2003-244093 A | 8/2003 |
| JP | 2004-80333 A | 3/2004 |
| JP | 2004-159303 A | 6/2004 |
| JP | 2004-253894 A | 9/2004 |
| JP | 2004-343546 A | 12/2004 |
| JP | 2005-020599 A | 1/2005 |
| JP | 2005-124177 A | 5/2005 |
| JP | 2005-136773 A | 5/2005 |
| JP | 2005-150814 A | 6/2005 |
| WO | 2003/058906 | 7/2003 |

OTHER PUBLICATIONS

T. Hwang, et al., "Iterative Cyclic Prefix reconstruction for Coded Single-Carrier Systems with Frequency-Domain Equalization(SC-FDE)", Vehicular Technology Conference, 2003, VTC 2003-Spring. The 57th IEEE Semiannual, 2003, p. 1841-1845.

S. Hijazi et al., "Flexible Spectrum Use and Better Coexistence at the Physical Layer of Future Wireless Systems Via a Multicarrier Platform", IEEE Wireless Communications, Apr. 2004, pp. 64-71.

International Search Report of PCT/JP2006/313142 dated Jul. 25, 2006.

* cited by examiner

ADAPTIVE RADIO/MODULATION APPARATUS, RECEIVER APPARATUS, WIRELESS COMMUNICATION SYSTEM, AND WIRELESS COMMUNICATION METHOD

TECHNICAL FIELD

The present invention relates to an adaptive radio/modulation apparatus, a receiver apparatus, a wireless communication system, and a wireless communication method for data transmission in a wireless channel.

BACKGROUND ART

In a radio scheme in the uplink of next generation mobile communication packet access, it is conventionally necessary to simultaneously realize a high transmission power efficiency of a terminal and high-speed data transmission in a multipath environment to expand an available communication area. Recently, a single-carrier (SC) system and a multicarrier (MC) system have been examined as a radio scheme to be determined with the above-mentioned request conditions taken into account. When the same transmission rate is realized, the single-carrier scheme performs a high-speed data transmission using one carrier at a predetermined frequency band. The multicarrier scheme divides a predetermined frequency band into a plurality of frequency bands, and performs a low-speed data transmission using a specific carrier at each frequency band.

In the packet access, an adaptive modulation scheme is used to maximize system throughput. The adaptive modulation scheme transmits data by the best effort of selecting the optimum modulation scheme depending on the propagation environment of a terminal. That is, when the propagation environment is hostile, a modulation scheme of a low modulation level is used, for example, to modulate data with errors suppressed by using phase shift keying (PSK). When the propagation environment is good, a modulation scheme of a high modulation level is used, for example, to modulate a large volume of data using a quadrature amplitude modulation (QAM). Selected, for example, is the optimum adaptive modulation scheme that measures the reception quality in an uplink from a terminal in a predetermined period by a base station, and transmits data of the terminal based on the measurement result. Then, the information about the modulation scheme (modulation mode) is transmitted to the terminal through a control channel in the downlink.

FIG. 1 shows an example of a configuration of the conventional adaptive modulation apparatus using the single-carrier scheme.

As shown in FIG. 1, the adaptive modulation apparatus using the single-carrier scheme according to the related art is configured by adaptive modulation part 101, single-carrier generation part 102, quadrature modulation part 103, and transmission amplifier 104. Adaptive modulation part 101 selects a modulation scheme in a predetermined period based on a modulation mode determined according to the reception information obtained when a signal transmitted in a wireless channel is received, and modulates a signal in the selected modulation scheme, Single-carrier generation part 102 allows the signal modulated by adaptive modulation part 101 to pass through a transmission filter, makes a symbol-waveform adjustment on the signal, and generates a single-carrier signal. Quadrature modulation part 103 performs a quadrature frequency conversion on the single-carrier signal in a baseband, and converts the signal into a carrier band signal. Transmission amplifier 104 amplifies the carrier band signal and transmits the signal to a transmission antenna.

FIG. 2 shows an example of a configuration of the conventional adaptive modulation apparatus by the multicarrier scheme.

The adaptive modulation apparatus using the multicarrier scheme according to the related art is configured by adaptive modulation part 101, multicarrier generation part 105, quadrature modulation part 103, and transmission amplifier 104. Adaptive modulation part 101 selects a modulation scheme in a predetermined period based on the modulation mode, and modulates a signal in the selected modulation scheme. Multicarrier generation part 105 divides the signal modulated by adaptive modulation part 101 into a plurality of parts, allows each of the signal parts to pass through a narrow band transmission filter, and generates a frequency divided multicarrier signal. Quadrature modulation part 103 performs a quadrature frequency conversion on the baseband multicarrier signal, and converts it into a carrier band signal. Transmission amplifier 104 amplifies the carrier band signal and outputs it to the transmission antenna. In the wireless communication system, multicarrier generation part 105 is widely used with the orthogonal frequency division multiplexing (OFDM) system capable of efficiently arranging a multicarrier signal at the shortest subcarrier frequency intervals.

In the configurations shown in FIGS. 1 and 2, only the minimal components are described, and the frequency conversion over plural stages, an amplifier, and a filter at each part are omitted.

FIG. 3 shows an example of a configuration of an OFDM transmission apparatus used as multicarrier generation part 105 shown in FIG. 2.

As shown in FIG. 3, the OFDM transmission apparatus according to the example of the configuration is configured by S/P converter 11, IDFT part 12, P/S converter 13, and GI addition part 14. S/P converter 11 performs an S/P conversion on a transmitted signal from a serial signal to a parallel signal, and divides each subcarrier into plural transmission sequences. There is a method of spreading or scrambling each subcarrier signal, but the description of the method is omitted here. IDFT part 12 performs an inverse discrete Fourier transform (IDFT) to convert all subcarrier signals into signals in a time domain, and outputs resultant signals. The signal in a time domain output from IDFT part 12 needs oversampling to remove a harmonic after an analog conversion. For example, as shown in FIG. 3, the size of IDFT part 12 is set larger than the number of subcarriers of the signal bands of the OFDM, and "0" is inserted into the harmonic part, thereby generating a signal of an oversampled time domain. As another method, the size of IDFT part 12 can be set to the number of subcarriers of the OFDM signal band to perform oversampling by the filtering process on the time domain. P/S converter 13 performs a P/S conversion on the signal converted into the time domain from a parallel signal to a serial signal, and outputs an OFDM signal rearranged in a time series. GI addition part 14 adds a guard interval (GI) to an OFDM signal rearranged in a time series to avoid the multipath interference with the previous block when the discrete Fourier transform (DFT) is performed at the reception time. Generally, a cyclic prefixing process is performed by adding the trailing data of the DFT block to the header.

In addition, there is a method of selecting one radio scheme from the above-mentioned two radio scheme s by providing a switch for switching between the single-carrier scheme and the multicarrier scheme (for example, refer to the Japanese Patent Laid-Open No. 2004-080333).

Since the adaptive modulation apparatus using the single-carrier scheme shown in FIG. 1 can set a low back-off (difference between the maximum output level at which no signal distortion occurs and the output saturation level) of transmission amplifier 104 by the low peak to average power ratio (PAPR) of a single-carrier signal, the apparatus excels in transmission power efficiency. The single-carrier scheme is congenial to a low PAPR modulation scheme, that is, a low order modulation scheme (for example, PSK), thereby making the most of the characteristic of the low PAPR of a single-carrier signal. However, the single-carrier scheme is badly degraded in reception characteristic when the QAM modulation that is poor in multipath resistance is used, thereby degrading the peak transmission rate. That is, the single-carrier scheme is not congenial to a high PAPR, that is, a high order modulation scheme (for example, QAM).

On the other hand, in the adaptive modulation apparatus using the multicarrier scheme shown in FIG. 2, since the multicarrier scheme has no effect of the multipath interference in delay of the GI length or less, a high-speed data transmission can be realized using the QAM modulation, and a higher-speed rate can be easily realized by applying MIMO (multiple input multiple output). That is, the multicarrier scheme is congenial to a high order modulation scheme. However, by a high PAPR of a multicarrier signal, the back-off of transmission amplifier 104 is to be set large regardless of the modulation scheme.

In the method described in the above-mentioned patent documents, the modulation scheme is not combined with the radio scheme.

DISCLOSURE OF THE INVENTION

To solve the above-mentioned problems, the present invention aims at providing an adaptive radio/modulation apparatus, a receiver apparatus, a wireless communication system, and a wireless communication method capable of simultaneously realizing high transmission power efficiency of a terminal and a high-speed data transmission.

To attain the above-mentioned advantage, the adaptive radio/modulation apparatus according to the present invention modulates a signal based on the propagation loss or the reception quality when the signal transmitted in a wireless channel is received and transmits the signal. The apparatus includes:

an adaptive modulation part for selecting a modulation scheme in a predetermined period based on the propagation loss or the reception quality, and modulating the signal in the modulation scheme;

a switch for selecting a radio scheme of a single-carrier scheme or a multicarrier scheme based on the propagation loss or the reception quality;

a single-carrier generation part for allowing the modulated signal to pass through a transmission filter, adjusting the symbol-waveform of the signal, and generating a single-carrier signal when the switch selects the single-carrier scheme;

a multicarrier generation part for dividing the modulated signal into a plurality of transmission sequences, allowing each divided signal part to pass through a transmission filter of a narrow band, and generating a frequency-divided multicarrier signal when the switch selects the multicarrier scheme;

a quadrature modulation part for performing a quadrature frequency conversion on the single-carrier signal or the multicarrier signal in a baseband into a carrier band signal; and a transmission amplifier for setting a back-off appropriate for a selected radio/modulation scheme based on the propagation loss or the reception quality, and amplifying the carrier band signal based on the back-off.

When the propagation loss is large or the reception quality is low, a low order modulation scheme is selected, and the single-carrier scheme is selected as a radio scheme, and when the propagation loss is small or the reception quality is high, a high order modulation scheme is selected, and the multicarrier scheme is selected as a radio scheme.

The multicarrier generation part generates a multicarrier signal in an OFDM scheme.

A modulation mode is determined according to the reception quality information when a signal transmitted in a wireless channel is received;

the adaptive modulation part selects a modulation scheme in a predetermined period based on the modulation mode, and modulates the signal in the modulation scheme;

the switch selects a radio scheme of the single-carrier scheme or the multicarrier scheme based on the modulation mode; and the transmission amplifier sets a back-off appropriate for a radio/modulation scheme selected based on the modulation mode, and amplifies the carrier band signal based on the back-off.

The switch selects the single-carrier scheme as a radio scheme when a low order modulation scheme is selected in the modulation mode, and selects the multicarrier scheme as a radio scheme when a high order modulation scheme is selected in the modulation mode.

The adaptive radio/modulation apparatus modulates a signal based on the propagation loss or the reception quality when the signal transmitted in a wireless channel is received. The apparatus includes:

an adaptive modulation part for selecting a modulation scheme in a predetermined period based on the propagation loss or the reception quality, and modulating the signal in the modulation scheme;

a switch for selecting a radio scheme of a single-carrier scheme or an OFDM scheme based on the propagation loss or the reception quality;

an S/P converter for S/P converting the modulated signal and outputting the signal when the switch selects the subcarrier system;

a DFT part for converting the signal output from the S/P converter into a frequency domain, and generating a single-carrier signal;

an S/P converter for S/P converting the modulated signal, dividing the signal into a plurality of transmission sequences of each subcarrier, and generating an OFDM signal when the switch selects an OFDM scheme;

an IDFT part for converting all subcarrier signals of the single-carrier signal or the OFDM signal into signals of time domains;

a P/S converter for rearranging the signals converted into time domains by the IDFT part in a time series;

a GI addition part for adding a guard interval to the signals rearranged in the time series;

a quadrature modulation part for performing a quadrature frequency conversion on the single-carrier signal or the OFDM signal in a baseband that are rearranged in the time series and provided with the guard interval into a carrier band signal; and a transmission amplifier for setting a back-off appropriate for a selected radio/modulation scheme based on the propagation loss or the reception quality, and amplifying the carrier band signal based on the back-off.

When the propagation loss is large or the reception quality is low, a low order modulation scheme is selected, and the single-carrier scheme is selected as a radio scheme, and when the propagation loss is small or the reception quality is high, a high order modulation scheme is selected, and the OFDM scheme is selected as a radio scheme.

A modulation mode is determined according to the reception quality information when a signal transmitted in a wireless channel is received;

the adaptive modulation part selects a modulation scheme in a predetermined period based on the modulation mode, and modulates the signal in the modulation scheme;

the switch selects a radio scheme of the single-carrier scheme or the OFDM scheme based on the modulation mode; and the transmission amplifier sets a back-off appropriate for a radio/modulation scheme based on the modulation mode, and amplifies the carrier band signal based on the back-off.

The switch selects the single-carrier scheme as a radio scheme when a low order modulation scheme is selected in the modulation mode, and selects the OFDM scheme as a radio scheme when a high order modulation scheme is selected in the modulation mode.

A receiver apparatus for receiving a signal modulated and transmitted in a modulation mode determined based on the reception quality information when the signal transmitted in a wireless channel is received includes:

a GI removing part for receiving a signal transmitted by a radio scheme of a single-carrier scheme or an OFDM scheme, and removing a portion corresponding to a guard interval from the signal;

an S/P converter for S/P converting a signal from which the guard interval is removed;

a DFT part for converting the S/P converted signal into a frequency domain;

an FDE part for equalizing and outputting the signals converted into the frequency domain in the frequency domain;

an IDFT part for converting a single-carrier signal transmitted in a single-carrier scheme in the signals output by the FDE part into a time domain signal;

a first P/S converter for P/S converting the single-carrier signal converted by the IDFT part and outputting a demodulation signal;

a second P/S converter for P/S converting the subcarrier signal of the OFDM signal transmitted in the OFDM scheme in the signals output by the FDE part, and outputting a demodulation signal;

a receiver switch for selecting a demodulation signal of the P/S converted single-carrier signal or the P/S converted OFDM signal based on the modulation mode; and a bit demodulation part for demodulating the transmission bit information about the demodulation signal selected by the receiver switch based on the modulation mode.

The FDE part equalizes received signals using a minimum mean average square error method or a Zero Forcing method.

In a wireless communication system having an adaptive radio/modulation apparatus which modulates a signal based on the propagation loss or the reception quality when a signal transmitted in a wireless channel is received, and a receiver apparatus which receives the signal transmitted from the adaptive radio/modulation apparatus, the adaptive radio/modulation apparatus includes:

an adaptive modulation part for selecting a modulation scheme in a predetermined period based on the propagation loss or the reception quality, and modulating the signal in the modulation scheme;

a switch for selecting a radio scheme of a single-carrier scheme or an OFDM scheme based on the propagation loss or the reception quality;

an S/P converter for S/P converting the modulated signal and outputting the signal when the switch selects the single-carrier scheme;

a DFT part for converting the signal output from the S/P converter into a frequency domain, and generating a single-carrier signal;

an S/P converter for S/P converting the modulated signal, dividing the signal into transmission sequences of each subcarrier, and generating an OFDM signal when the switch selects an OFDM scheme;

an IDFT part for converting all subcarrier signals of the single-carrier signal or the OFDM signal into signals of time domains;

a P/S converter for rearranging the signals converted into time domains by the IDFT part in a time series;

a GI addition part for adding a guard interval to the signals rearranged in the time series;

a quadrature modulation part for performing a quadrature frequency conversion on the single-carrier signal or the OFDM signal in a baseband that are rearranged in the time series and provided with the guard interval into a carrier band signal; and a transmission amplifier for setting a back-off appropriate for a selected radio/modulation scheme based on the propagation loss or the reception quality, and amplifying the carrier band signal based on the back-off, and the receiver apparatus includes:

a GI removing part for receiving a signal transmitted by a radio scheme of a single-carrier scheme or an OFDM scheme, and removing a portion corresponding to a guard interval from the signal;

an S/P converter for S/P converting a signal from which the guard interval is removed;

a DFT part for converting the S/P converted signal into a frequency domain;

an FDE part for equalizing and outputting the signals converted into the frequency domain in the frequency domain;

an IDFT part for converting a single-carrier signal transmitted in a single-carrier scheme in the signals output by the FDE part into a time domain signal;

a first P/S converter for P/S converting the single-carrier signal converted by the IDFT part and outputting a demodulation signal;

a second P/S converter for P/S converting the subcarrier signal of the OFDM signal transmitted in the OFDM scheme in the signals output by the FDE part, and outputting a demodulation signal;

a receiver switch for selecting a demodulation signal of the P/S converted single-carrier signal or the P/S converted OFDM signal based on the propagation loss or the reception quality; and a bit demodulation part for demodulating the transmission bit information about the demodulation signal selected by the receiver switch based on the propagation loss or the reception quality.

A plurality of users have the respective adaptive radio/modulation apparatuses and the receiver apparatuses, and a plurality of users perform frequency division multiple access in a predetermined band.

The adaptive radio/modulation apparatus determines a modulation mode according to the reception quality information when a signal transmitted in a wireless channel is received;

the adaptive modulation part selects a modulation scheme in a predetermined period based on the modulation mode, and modulates the signal in the modulation scheme;

the switch selects a radio scheme of the single-carrier scheme or the OFDM scheme based on the modulation mode;

the transmission amplifier sets a back-off appropriate for a radio/modulation scheme based on the modulation mode, and amplifies the carrier band signal based on the back-off;

the receiver switch selects a demodulation signal of the P/S converted single-carrier signal or the P/S converted OFDM signal based on the modulation mode; and the bit demodulation part demodulates transmission bit information about the demodulation signal selected by the receiver switch based on the modulation mode.

A wireless communication method for modulating a signal by an adaptive radio/modulation apparatus based on the propagation loss or the reception quality when the signal transmitted in a wireless channel is received, and transmitting the modulated signal to a receiver apparatus includes:

a step of selecting a modulation scheme in a predetermined period based on the propagation loss or the reception quality;

a step of modulating the signal in the modulation scheme;

a step of selecting a radio scheme of a single-carrier scheme or a multicarrier scheme based on the propagation loss or the reception quality;

a step of allowing the modulated signal to pass through a transmission filter when the switch selects the single-carrier scheme, adjusting the symbol-waveform of the signal, and generating a single-carrier signal;

a step of dividing the modulated signal into a plurality of transmission sequences, allowing each divided signal part to pass through a transmission filter of a narrow band, and generating a frequency-divided multicarrier signal when the switch selects the multicarrier scheme;

a step of performing a quadrature frequency conversion on the single-carrier signal or the multicarrier signal in a baseband into a carrier band signal;

a step of setting a back-off appropriate for a selected radio/modulation scheme based on the propagation loss or the reception quality;

a step of amplifying the carrier band signal based on the back-off; and a step of transmitting the amplified signal from the adaptive radio/modulation apparatus to the receiver apparatus.

The method also includes:

a step of determining a modulation mode based on the reception quality information when a signal transmitted in the wireless channel is received;

a step of selecting a modulation scheme in a predetermined period based on the modulation mode;

a step of selecting a radio scheme of a single-carrier scheme or a multicarrier scheme based on the modulation mode; and a step of setting a back-off appropriate for a radio/modulation scheme selected based on the modulation mode.

In the present invention with the above-mentioned configuration, the adaptive modulation part modulates a signal in a modulation scheme selected based on the propagation loss or the reception quality, the switch selects a radio scheme congenial to the modulation scheme in which the signal is modulated, the single-carrier generation part generates a single-carrier signal when the selected radio scheme is a single-carrier scheme, the multicarrier generation part generates a multicarrier signal when the selected radio scheme is a multicarrier scheme, the quadrature modulation part converts the generated single-carrier signal or multicarrier signal into a carrier band signal, and the transmission amplifier amplifies the converted signal.

Thus, a combination of a modulation scheme and a radio scheme for transmitting a data signal after modulating the signal based on the propagation loss or the reception quality can be adaptively selected, thereby realizing efficiency of the transmission power for transmission of a signal from a terminal and a high-speed data transmission simultaneously.

In the present invention, the adaptive modulation part modulates a signal in a modulation scheme selected based on the propagation loss or the reception quality, the switch selects a radio scheme congenial to the modulation scheme in which the signal is modulated, the single-carrier generation part generates a single-carrier signal when the selected radio scheme is a single-carrier scheme, the multicarrier generation part generates a multicarrier signal when the selected radio scheme is a multicarrier scheme, the quadrature modulation part converts the generated single-carrier signal or multicarrier signal into a carrier band signal, and the transmission amplifier amplifies the converted signal. With the above-mentioned configuration, high transmission power efficiency of a terminal and a high-speed data transmission can be simultaneously realized.

BRIEF DESCRIPTION OF THE DRAWINGS

FIG. 6a shows the configuration of generating an isolated impulse signal when a modulation symbol is "1" by the signal processing of a frequency domain;

FIG. 6b shows an impulse response output from the P/S converter shown in FIG. 6a;

FIG. 7a shows the configuration of generating a single-carrier signal by the signal processing of a frequency domain;

FIG. 7b shows a single-carrier signal output from the P/S converter shown in FIG. 7a;

BEST MODE FOR CARRYING OUT THE INVENTION

The exemplary embodiments of the present invention are described below with reference to the attached drawings.

Figure 4:
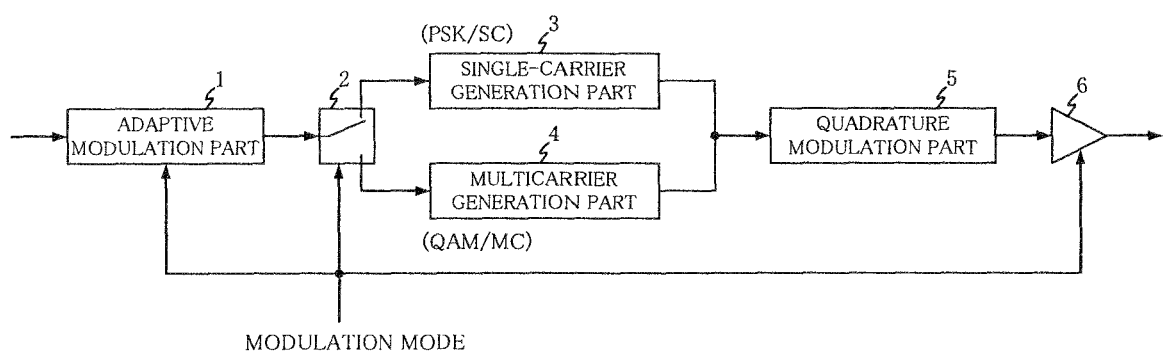
FIG. 4 shows an exemplary embodiment of the adaptive radio/modulation apparatus according to the present invention.

FIG. 4 shows an exemplary embodiment of the adaptive radio/modulation apparatus according to the present invention.

As shown in FIG. 4, the present exemplary embodiment is configured by adaptive modulation part 1, switch 2, single-carrier generation part 3, multicarrier generation part 4, quadrature modulation part 5, and transmission amplifier 6.

Adaptive modulation part 1 selects a modulation scheme in a predetermined period based on the modulation mode determined according to the reception quality information when a signal transmitted in a wireless channel is received, and modulates the signal in the selected modulation scheme. Switch 2 inputs the signal modulated by adaptive modulation part 1, and selects a radio scheme of a single-carrier scheme or a multicarrier scheme based on the modulation mode. When switch 2 selects a single-carrier scheme, single-carrier generation part 3 allows the modulated signal to pass through a transmission filter, adjusts a symbol waveform, and generates a single-carrier signal. When switch 2 selects a multicarrier scheme, multicarrier generation part 4 divides the modulated signal into a plurality of transmission sequences, and allows each sequence to pass through a transmission filter of a narrow band, thereby generating a frequency divided multicarrier signal. Quadrature modulation part 5 performs a quadrature frequency conversion on a baseband single-carrier signal or multicarrier signal into a carrier band signal. Transmission amplifier 6 sets a back-off appropriate for the radio/modulation scheme selected based on the modulation mode, amplifies a carrier band signal based on the set back-off and outputs the signal to a transmission antenna. Multicarrier generation part 4 can be used with an OFDM scheme capable of efficiently arranging a multicarrier signal at the minimum subcarrier frequency intervals. In the exemplary embodiment shown in FIG. 4, only the minimal component is described, and the frequency conversion over plural stages, an amplifier and a filter at each component are omitted. The reception quality information includes the values of a propagation loss and reception quality measured when a signal transmitted in a wireless channel is received. The modulation mode is to switch a modulation scheme between a low order modulation scheme and a high order modulation scheme.

In the present exemplary embodiment, the modulation scheme and radio scheme can be optionally combined. However, to simultaneously realize the high transmission power efficiency of a terminal and a high-speed data transmission, it is a desired method to transmit a signal by selecting a single-carrier scheme as a radio scheme to be combined with a low order modulation scheme (for example, PSK), and selecting a multicarrier scheme as a radio scheme (for example, QAM) to be combined with a high order modulation scheme.

As described above, according to the present exemplary embodiment, a modulation mode in which a signal is modulated according to reception quality information is determined. When a signal is modulated by a low order modulation scheme selected based on the determined modulation mode, the signal is transmitted by the radio scheme of the single-carrier scheme. When the signal is modulated by a high order modulation scheme, the signal is transmitted by the radio scheme of the multicarrier scheme. For example, when a propagation loss is large or reception quality is low, the low order modulation scheme is selected and the single-carrier scheme is selected as a radio scheme. When the propagation loss is small or reception quality is high, the high order modulation scheme is selected and the multicarrier scheme is selected as a radio scheme. Thus, by adaptively combining the modulation scheme and the radio scheme, a high transmission power efficiency of a terminal and a high-speed data transmission can be simultaneously realized.

In the present exemplary embodiment, the processes of single-carrier generation part 3 and multicarrier generation part 4 are independent of each other. On the other hand, the process of single-carrier generation part 3 can be performed by the signal processing of a frequency domain.

Figure 5:
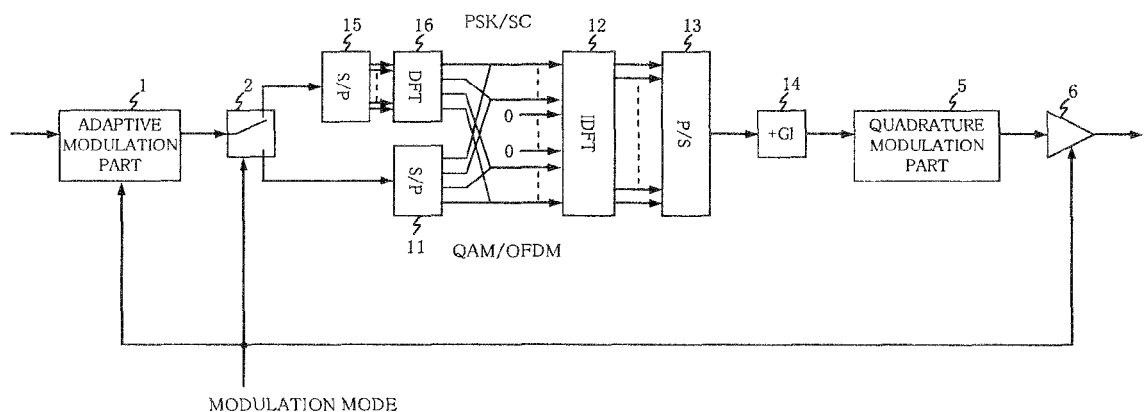
FIG. 5 shows another exemplary embodiment of the adaptive radio/modulation apparatus according to the present invention.

FIG. 5 shows another exemplary embodiment of the adaptive radio/modulation apparatus.

As illustrated in FIG. 5, the present exemplary embodiment is configured by adaptive modulation part 1, switch 2, S/P converters 11 and 15, DFT part 16, IDFT part 12, P/S converter 13, GI addition part 14, quadrature modulation part 5, and transmission amplifier 6.

Adaptive modulation part 1 selects a modulation scheme in a predetermined period based on the modulation mode determined depending on the reception quality when a signal transmitted in a wireless channel is received, and modulates the signal by the selected modulation scheme. Switch 2 inputs the signal modulated by adaptive modulation part 1, and selects either of a radio scheme of the single-carrier scheme or the OFDM scheme depending on the modulation mode. The route through S/P converter 15, DFT part 16, IDFT part 12, P/S converter 13, and GI addition part 14 is a route in which the modulated signal is input when switch 2 selects the single-carrier scheme, and a single-carrier signal is generated by the signal processing of a frequency domain. The operation of each component is described later. The method of generating a single-carrier signal by the signal processing of a frequency domain is described in, for example, the non-patent document "S. Hijazi, B. Natarajan, M. Michelini, Z. Wu, and C. R. Nassar, "Flexible Spectrum Use and Better Coexistence at the Physical Layer of Future Wireless Systems via a Multicarrier Platform," IEEE Wireless Communications, pp. 64-71, April 2004".

Figure 6:
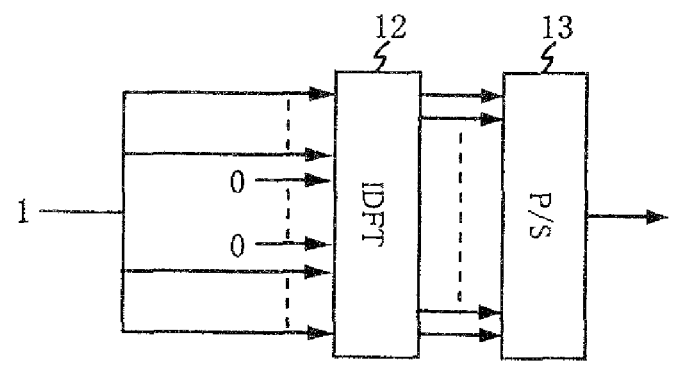
Figure 6:
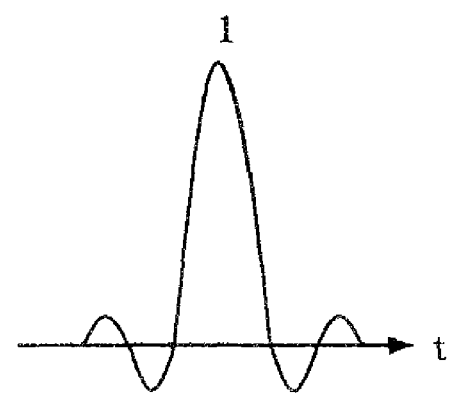

FIG. 6a shows the configuration of generating an isolated impulse signal when the modulation symbol is set to "1" by the signal processing of a frequency domain. FIG. 6b shows an impulse response output from P/S converter 13 shown in FIG. 6a.

The configuration is made by IDFT part 12 and P/S converter 13 as shown in FIG. 6a.

When all subcarrier signals generated by copying the modulation symbol "1" to the subcarrier corresponding to the symbol frequency band, and inserting "0" into a high frequency portion are input to IDFT part 12, IDFT part 12 converts the all subcarrier signals into signals of time domains. P/S converter 13 P/S converts the signal converted into a time domain, and outputs an impulse response of the modulation symbol "1" shown in FIG. 6b.

A single-carrier signal can be generated by performing multiple-symbol multiplexing on the isolated impulse signal of the modulation symbol by shifting the time by an integral multiple of the modulation symbol period $$Ts \qquad \text{[Formula 1]}.$$

Figure 7:
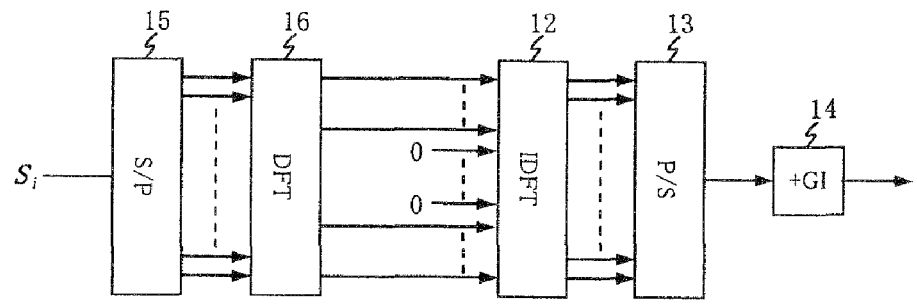
Figure 7:
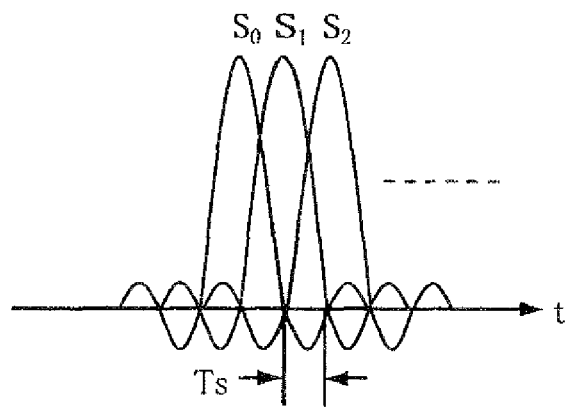

FIG. 7a shows the configuration of generating a single-carrier signal by the signal processing of a frequency domain. FIG. 7b shows a single-carrier signal output from P/S converter 13 shown in FIG. 7a.

The configuration is made by S/P converter 15, DFT part 16, IDFT part 12, P/S converter 13, and GI addition part 14 as shown in FIG. 7a.

S/P converter 15 S/P converts the modulation symbol $$s_i \qquad \text{[Formula 4]}$$

by assuming the $$i \qquad \text{[Formula 2]}$$

-th modulation symbol as $$s_i \qquad \text{[Formula 3]}.$$

DFT part 16 copies each modulation symbol to a subcarrier corresponding to a symbol frequency band, and provides each modulation symbol with a phase shift corresponding to a time shift of a time domain in a frequency domain. IDFT part 12 converts all subcarrier signals into signals of time domains. P/S converter 13 P/S converts the signal converted into a time domain, and outputs a single-carrier signal obtaining by arranging a modulation symbol $$s_i \quad \text{[Formula 5]}$$

at intervals of $$T_S \quad \text{[Formula 6]}.$$

The process of generating a single-carrier signal in a frequency domain is represented by the following equation when the single-carrier signal is set as $$s(t) \quad \text{[Formula 7]}.$$

$$s(t) = \sum_{n=0}^{N-1} \left( \sum_{i=0}^{N-1} s_i e^{-j2\pi (i)(n)\Delta f T s} \right) e^{j2\pi (n)\Delta f t} \quad \text{[Formula 8]}$$

where $$\Delta f \quad \text{[Formula 9]}$$

indicates a subcarrier interval. In the configuration shown in FIG. 7a, "0" is inserted outside a symbol frequency band. This corresponds to passing an ideal low pass filter (square frequency characteristic) as a transmission filter, and the impulse response of a time domain is sine function. In the present invention, a transmission filter of any frequency characteristic (for example, a raised cosine roll off characteristic) can be used in a frequency domain. The transmission filter can also be used in a time domain. Similar to the conventional OFDM scheme, GI addition part 14 adds a GI to avoid the multipath interference with a previous block when a DFT processing and a frequency domain equalizer are used at reception time.

Figure 1:
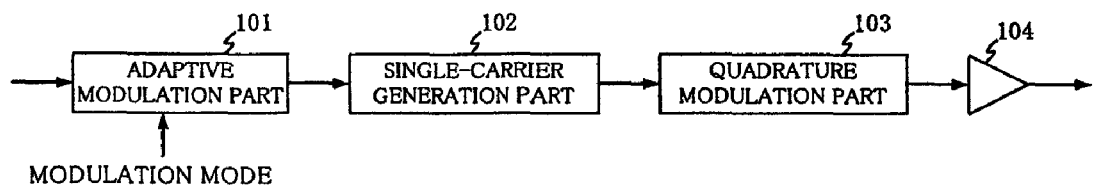
FIG. 1 shows an example of a configuration of the conventional adaptive modulation apparatus using a single-carrier scheme.
Figure 2:
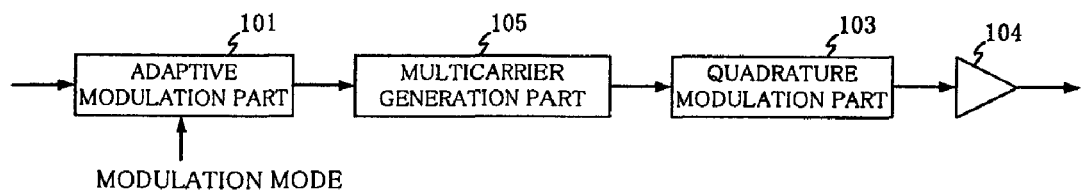
FIG. 2 shows an example of a configuration of the conventional adaptive modulation apparatus using a multicarrier scheme.
Figure 3:
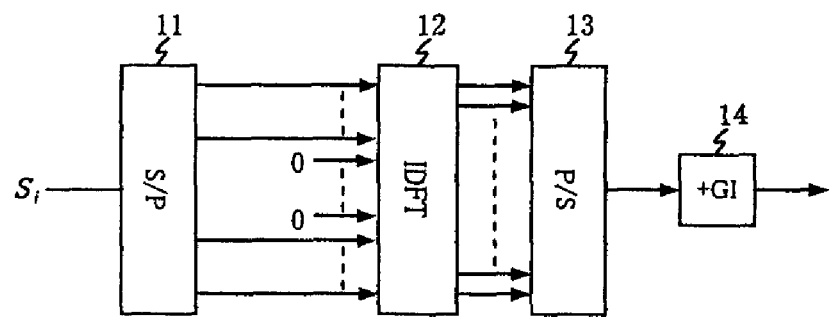
FIG. 3 shows an example of a configuration of an OFDM transmission apparatus used as the multicarrier generation part shown in FIG. 2.

The route passing through S/P converter 11, IDFT part 12, P/S converter 13, and GI addition part 14 shown in FIG. 5 is a route in which a modulated signal is input when switch 2 selects the OFDM scheme, and an OFDM signal is generated. The operations of S/P converter 11, IDFT part 12, P/S converter 13, and GI addition part 14 shown in FIG. 5 are the same as the operations of S/P converter 15, IDFT part 12, P/S converter 13, and GI addition part 14 shown in FIG. 3.

Quadrature modulation part 5 performs a quadrature frequency conversion on a single-carrier signal or an OFDM signal of a baseband into a carrier band signal. Transmission amplifier 6 sets a back off appropriate for the adaptive radio/modulation scheme selected based on the modulation mode amplifies a carrier band signal based on the set back off, and outputs the signal to a transmission antenna.

Figure 8:
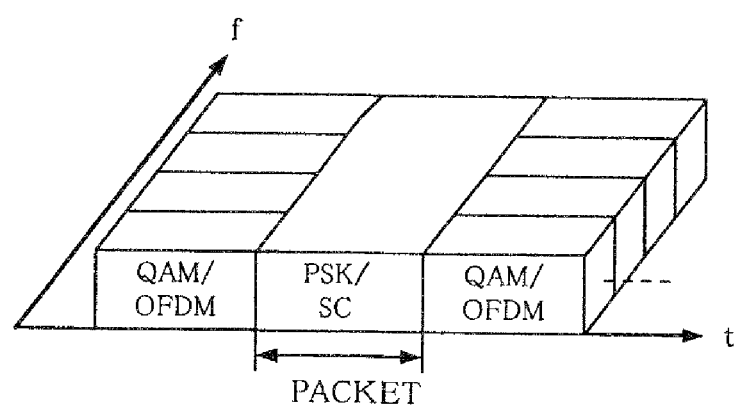
FIG. 8 shows a transmission signal generated according to an exemplary embodiment of the present invention.

FIG. 8 shows a transmission signal generated according to an exemplary embodiment of the present invention.

In FIG. 8, when adaptive modulation is performed in a packet unit, the optimum combination of a modulation scheme and a radio scheme, for example, the QAM system and the OFDM scheme, or, the PSK system and the single-carrier scheme, etc., is selected for each packet.

Figure 9:
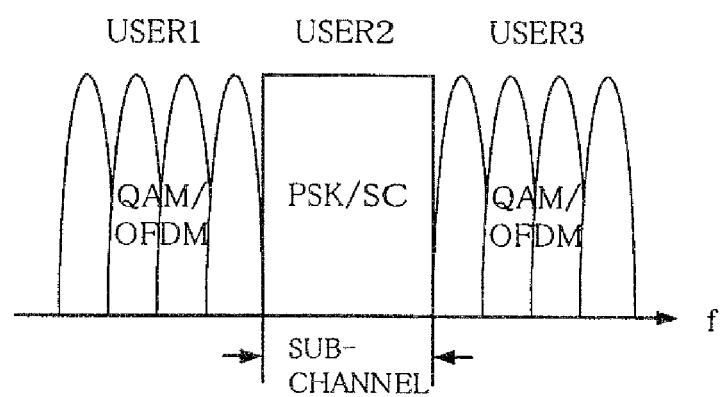
FIG. 9 shows a spectrum when a plurality of users perform frequency division multiple access (FDMA)

FIG. 9 shows a spectrum when a plurality of users perform frequency division multiple access (FDMA) in a predetermined frequency band.

As shown in FIG. 9, adaptive radio/modulation is performed independently for each user, and a single-carrier signal or an OFDM signal is optionally selected. At this time, the single-carrier signal generated in the signal processing of a frequency domain can be regarded as a complex-weighted specific OFDM signal. Thus, when synchronization is obtained for each user within the GI length, the siderobe components of the single-carrier signal and the OFDM signal are orthogonal to each other. Therefore, the guard band of the frequency band (subchannel) occupied for each user can be reduced.

As described above, according to the present exemplary embodiment, a modulation mode in which a signal is modulated according to reception quality information is determined. When a signal is modulated by a low order modulation scheme selected based on the determined modulation mode, the signal is transmitted by the radio scheme of the single-carrier scheme. When the signal is modulated by a high order modulation scheme, the signal is transmitted by the radio scheme of the OFDM scheme. For example, when a propagation loss is large or reception quality is low, the low order modulation scheme is selected and the single-carrier scheme is selected as a radio scheme. When the propagation loss is small or reception quality is high, the high order modulation scheme is selected and the OFDM scheme is selected as a radio scheme. Thus, by adaptively combining the modulation scheme and the radio scheme, a high transmission power efficiency of a terminal and a high-speed data transmission can be simultaneously realized. By the single-carrier signal being generated by the signal processing of a frequency domain, the processes of the component of generating a multicarrier signal using the OFDM scheme and IDFT part 12 can be made to common, thereby reducing the size of the entire apparatus.

Figure 10:
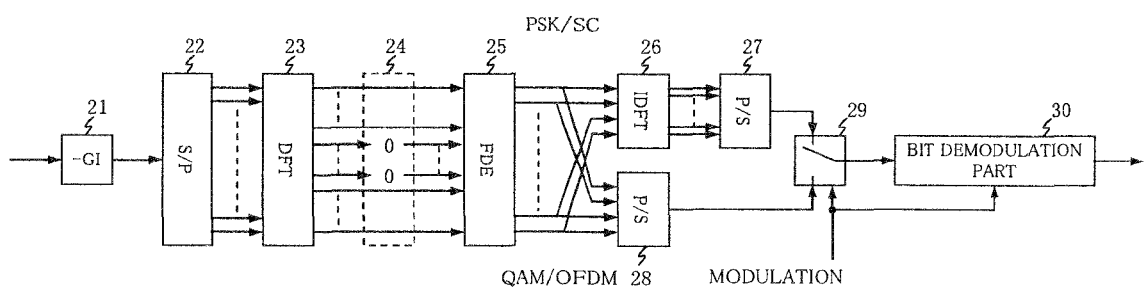
FIG. 10 shows an exemplary embodiment of the receiver apparatus according to the present invention.

FIG. 10 shows an exemplary embodiment of the receiver apparatus according to the present invention.

As shown in FIG. 10, the present exemplary embodiment is configured by GI removing part 21, S/P converter 22, DFT part 23, reception filter 24, FDE part 25, IDFT part 26, P/S converter 27 as a first P/S converter, P/S converter 28 as a second P/S converter, switch 29 as a receiver switch, and bit demodulation part 30. The present exemplary embodiment is a receiver apparatus for receiving a signal transmitted from the adaptive radio/modulation apparatus shown in FIG. 5.

The route passing through GI removing part 21, S/P converter 22, DFT part 23, reception filter 24, FDE part 25, IDFT part 26, and P/S converter 27 shown in FIG. 10 is a route in which a single-carrier signal is demodulated by the signal processing of a frequency domain.

GI removing part 21 inputs a received single-carrier signal, and removes a portion corresponding to the GI from the received signal. S/P converter 22 S/P converts a received signal from which the GI is removed. DFT part 23 converts the S/P converted received signal into a frequency domain. Reception filter 24 restricts the band of the single-carrier signal by the signal processing of the frequency domain. In the exemplary embodiment shown in FIG. 10, setting the outside of the symbol frequency band to "0" corresponds to passing an ideal low pass filter (square frequency characteristic). In the present invention, a reception filter of any frequency characteristic (for example, a raised cosine roll off characteristic) can be used in a frequency domain. The reception filter can also be used in a time domain. FDE part 25 is a frequency domain equalizer (FDE) which inputs the frequency-converted received single-carrier signal, and equalizes the received signal in a frequency domain. An equalizing algorithm can be a minimum mean square error method (MMSE), a zero forcing method, etc. For example, using the MMSE, the equalizing weight $$w(m) \quad \text{[Formula 10]}$$

in the subcarrier m of a frequency domain is calculated by the following equation.

$$w(m) = \frac{\hat{h}^*(m)}{|\hat{h}^*(m)|^2 + \sigma^2}$$ [Formula 11]

where the subscript * is a complex conjugate, $$\sigma^2$$ [Formula 12]

is noise power, $$\hat{h}(m)$$ [Formula 13]

is a channel estimate value of a subcarrier m. There are various methods of estimating a channel estimate value $$\hat{h}(m)$$ [Formula 14], but any channel estimating method can be applied to the present invention. IDFT part 26 inputs an equalization signal of a frequency domain as the output of FDE part 25, and converts the signal into a signal of a time domain. P/S converter 27 P/S converts a signal converted into a time domain, and outputs it as a demodulation signal.

The route passing through GI removing part 21, S/P converter 22, DFT part 23, reception filter 24, FDE part 25, and P/S converter 28 shown in FIG. 10 is a route in which an OFDM signal is demodulated. GI removing part 21 inputs the received OFDM signal, and removes the portion corresponding to the GI from the received signal. S/P converter 22 S/P converts the received signal from which the GI has been removed. DFT part 23 converts the S/P converted received signal into a frequency domain. Since reception filter 24 does not require a band restriction on an OFDM signal, it allows all subcarrier signals to pass through. FDE part 25 equalizes a received OFDM signal (channel correction). Since each subcarrier has specific information in the frequency domain, an OFDM signal requires no MMSE equalization like a single-carrier signal. For example, if the zero forcing method is used to perform level normalization in addition to the channel correction, the equalization weight $$w(m)$$ [Formula 15]

in the subcarrier m of the frequency domain is calculated by the following equation.

$$w(m) = \frac{\hat{h}^*(m)}{|\hat{h}^*(m)|^2}$$ [Formula 16]

where the subscript * is a complex conjugate, and $$\hat{h}(m)$$ [Formula 17]

is a channel estimate value of the subcarrier m. There are various methods of estimating a channel estimate value $$\hat{h}(m)$$ [Formula 18], but any channel estimating method can be applied to the present invention. P/S converter 28 P/S converts the equalized subcarrier signal of the OFDM, and outputs the result as a demodulation signal. Switch 29 selects a demodulation signal of the single-carrier signal or the OFDM signal based on the modulation mode. Bit demodulation part 30 demodulates the transmission bit information about the demodulation signal based on the modulation mode.

As described above, the receiver apparatus according to the present exemplary embodiment performs the receiving process of a single-carrier signal by the signal processing of the frequency domain. As a result, the processes of the component of receiving a multicarrier signal using the OFDM scheme and DFT part 23 can be made to common, thereby reducing the size of the entire apparatus.

The invention claimed is:

1. An adaptive radio/modulation apparatus which modulates a signal based on a propagation loss or reception quality when the signal transmitted in a wireless channel is received, comprising:
    an adaptive modulation part for selecting a modulation scheme in a predetermined period based on the propagation loss or the reception quality, and modulating the signal in the modulation scheme;
    a switch for selecting a radio scheme of a single-carrier scheme or an orthogonal frequency division multiplexing (OFDM) scheme based on the propagation loss or the reception quality;
    a serial to parallel (S/P) converter for S/P converting the modulated signal and outputting the signal when the switch selects the single-carrier scheme;
    a discrete Fourier transform (DFT) part for converting the signal output from the S/P converter into a frequency domain, and generating a single-carrier signal;
    a second S/P converter for S/P converting the modulated signal, dividing the signal into a plurality of transmission sequences of each subcarrier, and generating an OFDM signal when the switch selects the OFDM scheme;
    an inverse discrete Fourier transform (IDFT) part for converting the single-carrier signal or all subcarrier signals of the OFDM signal into signals of time domains;
    a parallel to serial (P/S) converter for rearranging the signals converted into time domains by the IDFT part in a time series;
    a guard interval (GI) addition part for adding a guard interval to the signals rearranged in the time series;
    a quadrature modulation part for performing a quadrature frequency conversion on the single-carrier signal or the OFDM signal in a baseband that are rearranged in the time series and provided with the guard interval into a carrier band signal; and
    a transmission amplifier for setting a back-off appropriate for a selected radio/modulation scheme based on the propagation loss or the reception quality, and amplifying the carrier band signal based on the back-off.

2. The adaptive radio/modulation apparatus according to claim 1, wherein
    when the propagation loss is large or the reception quality is low, a low order modulation scheme is selected, and the single-carrier scheme is selected as a radio scheme, and when the propagation loss is small or the reception quality is high, a high order modulation scheme is selected, and the OFDM scheme is selected as a radio scheme.

3. The adaptive radio/modulation apparatus according to claim 1, wherein
    a modulation mode is determined according to the reception quality information when a signal transmitted in a wireless channel is received;
    the adaptive modulation part selects a modulation scheme in a predetermined period based on the modulation mode, and modulates the signal in the modulation scheme;

the switch selects a radio scheme of the single-carrier scheme or the OFDM scheme based on the modulation mode; and the transmission amplifier sets a back-off appropriate for a radio/modulation scheme based on the modulation mode, and amplifies the carrier band signal based on the back-off.

4. The adaptive radio/modulation apparatus according to claim 3, wherein the switch selects the single-carrier scheme as the radio scheme when a low order modulation scheme is selected in the modulation mode, and selects the OFDM scheme as the radio scheme when a high order modulation scheme is selected in the modulation mode.

5. A receiver apparatus which receives a signal modulated and transmitted in a modulation mode determined based on reception quality information when the signal transmitted in a wireless channel is received, comprising:

a guard interval (GI) removing part for receiving a signal transmitted by a radio scheme of a single-carrier scheme or an orthogonal frequency division multiplexing (OFDM) scheme, and removing a portion corresponding to a guard interval from the signal;

a serial to parallel (S/P) converter for S/P converting a signal from which the guard interval is removed;

a discrete Fourier transform (DFT) part for converting the S/P converted signal into a frequency domain;

a frequency domain equalizer (FDE) part for equalizing and outputting the signals converted into the frequency domain in the frequency domain;

an inverse discrete Fourier transform (IDFT) part for converting a single-carrier signal transmitted in a single-carrier scheme in the signals output by the FDE part into a time domain signal;

a first parallel to serial (P/S) converter for P/S converting the single-carrier signal converted by the IDFT part and outputting a demodulation signal;

a second P/S converter for P/S converting a subcarrier signal of an OFDM signal transmitted in the OFDM scheme in the signals output by the FDE part, and outputting a demodulation signal;

a receiver switch for selecting a demodulation signal of the P/S converted single-carrier signal or the P/S converted OFDM signal based on the modulation mode; and a bit demodulation part for demodulating the transmission bit information from the demodulation signal selected by the receiver switch based on the modulation mode.

6. The receiver apparatus according to claim 5, wherein the FDE part equalizes received signals using a minimum mean square error method or a Zero Forcing method.

7. A wireless communication system having an adaptive radio/modulation apparatus which modulates a signal based on a propagation loss or reception quality when a signal transmitted in a wireless channel is received, and a receiver apparatus which receives the signal transmitted from the adaptive radio/modulation apparatus, the adaptive radio/modulation apparatus comprising:

an adaptive modulation part for selecting a modulation scheme in a predetermined period based on the propagation loss or the reception quality, and modulating the signal in the modulation scheme;

a switch for selecting a radio scheme of a single-carrier scheme or an orthogonal frequency division multiplexing (OFDM) scheme based on the propagation loss or the reception quality;

a serial to parallel (S/P) converter for S/P converting the modulated signal and outputting the signal when the switch selects the single-carrier scheme;

a discrete Fourier transform (DFT) part for converting the signal output from the S/P converter into a frequency domain, and generating a single-carrier signal;

a second S/P converter for S/P converting the modulated signal, dividing the signal into transmission sequences of each subcarrier, and generating an OFDM signal when the switch selects the OFDM scheme;

an inverse discrete Fourier transform (IDFT) part for converting the single-carrier signal or all subcarrier signals of the OFDM signal into signals of time domains;

a parallel to serial (P/S) converter for rearranging the signals converted into time domains by the IDFT part in a time series;

a guard interval (GI) addition part for adding a guard interval to the signals rearranged in the time series;

a quadrature modulation part for performing a quadrature frequency conversion on the single-carrier signal or the OFDM signal in a baseband that are rearranged in the time series and provided with the guard interval into a carrier band signal; and a transmission amplifier for setting a back-off appropriate for a selected radio/modulation scheme based on the propagation loss or the reception quality, and amplifying the carrier band signal based on the back-off, and the receiver apparatus comprising:

a GI removing part for receiving a signal transmitted by a radio scheme of a single-carrier scheme or an OFDM scheme, and removing a portion corresponding to a guard interval from the signal;

a third S/P converter for S/P converting a signal from which the guard interval is removed;

a second DFT part for converting the S/P converted signal into a frequency domain;

a frequency domain equalizer (FDE) part for equalizing and outputting the signals converted into the frequency domain in the frequency domain;

a second IDFT part for converting a single-carrier signal transmitted in a single-carrier scheme in the signals output by the FDE part into a time domain signal;

a second P/S converter for P/S converting the single-carrier signal converted by the second IDFT part and outputting a demodulation signal;

a third P/S converter for P/S converting a subcarrier signal of an OFDM signal transmitted in the OFDM scheme in the signals output by the FDE part, and outputting a demodulation signal;

a receiver switch for selecting a demodulation signal of the P/S converted single-carrier signal or the P/S converted OFDM signal based on the propagation loss or the reception quality; and a bit demodulation part for demodulating the transmission bit information from the demodulation signal selected by the receiver switch based on the propagation loss or the reception quality.

8. The wireless communication system according to claim 7, wherein a plurality of users have a respective adaptive radio/modulation apparatuses and a receiver apparatuses that perform frequency division multiple access in a predetermined band.

9. The wireless communication system according to claim 7, wherein
 the adaptive radio/modulation apparatus determines a modulation mode according to the reception quality information when a signal transmitted in a wireless channel is received;
 the adaptive modulation part selects a modulation scheme in a predetermined period based on the modulation mode, and modulates the signal in the modulation scheme;
 the switch selects a radio scheme of the single-carrier scheme or the OFDM scheme based on the modulation mode;
 the transmission amplifier sets a back-off appropriate for a radio/modulation scheme based on the modulation mode, and amplifies the carrier band signal based on the back-off;
 the receiver switch selects a demodulation signal of the P/S converted single-carrier signal or the P/S converted OFDM signal based on the modulation mode; and
 the bit demodulation part demodulates transmission bit information from the demodulation signal selected by the receiver switch based on the modulation mode.

* * * * *